United States Patent [19]

Kaukeinen

[11] Patent Number: 4,802,741
[45] Date of Patent: Feb. 7, 1989

[54] IN-DEPTH ELECTRODE LIGHT VALVE ARRAY DEVICES AND IMPROVED FABRICATION METHOD THEREFOR

[75] Inventor: Joseph Y. Kaukeinen, Rochester, N.Y.

[73] Assignee: Eastman Kodak Company, Rochester, N.Y.

[21] Appl. No.: 107,230

[22] Filed: Oct. 9, 1987

[51] Int. Cl.$^4$ .............................................. G02F 1/03
[52] U.S. Cl. ................................... 350/392; 350/356; 350/388
[58] Field of Search .................. 350/356, 342, 388; 427/97

[56] References Cited

U.S. PATENT DOCUMENTS

| | | | |
|---|---|---|---|
| 3,357,856 | 12/1967 | Ragan et al. | 427/97 |
| 3,862,795 | 1/1975 | Tellerman | 350/342 |
| 3,873,187 | 3/1975 | Brooks | 350/392 |
| 4,024,629 | 5/1977 | Lemoine et al. | 427/97 |
| 4,406,521 | 9/1983 | Mir et al. | 350/392 |
| 4,491,393 | 1/1985 | Roelants | 350/388 |
| 4,569,573 | 2/1986 | Agostinelli | 350/320 |
| 4,697,889 | 10/1987 | Takubo et al. | 350/392 |
| 4,707,081 | 11/1987 | Mir | 350/388 |

FOREIGN PATENT DOCUMENTS

| | | | |
|---|---|---|---|
| 161831 | 10/1982 | Japan | 350/342 |
| 158417 | 8/1985 | Japan | 350/356 |
| 216327 | 10/1985 | Japan | 350/356 |
| 237426 | 11/1985 | Japan | 350/356 |
| WO83/03040 | 9/1983 | PCT Int'l Appl. | |

Primary Examiner—John K. Corbin
Assistant Examiner—Martin Lerner
Attorney, Agent, or Firm—John D. Husser

[57] ABSTRACT

A method of making a linear light valve array having a plurality of transversely driven, discretely addressable, electro-optic gates, includes the steps of (i) cutting parallel grooves of uniform depth to form a land region on a wafer of electro-optical material; (ii) holding a stencil having reference and address electrode patterns over the land region and groove portions of the wafer; and (iii) depositing conductive material through the stencil to form address and reference electrodes on opposing side walls of the land region. Linear and two-dimensional modulator devices made by such method are disclosed also.

10 Claims, 4 Drawing Sheets

IN-DEPTH ELECTRODE LIGHT VALVE ARRAY DEVICES AND IMPROVED FABRICATION METHOD THEREFOR

BACKGROUND OF THE INVENTION

1. Field of the Invention

The present invention relates to electro-optic modulator arrays, e.g. arrays comprising PLZT (lanthanum substituted lead titanite zirconate) pixel portions that are addressable electrically for use in light valve devices, and more particularly to improved fabrication methods for, and constructions of, such arrays.

2. Background Art

U.S. Pat. No. 4,406,521 describes an imaging apparatus empolying light valve devices of the class referred to above. In general, light valve devices of this kind employ an electroded PLZT modulator panel sandwiched between crossed polarizers and the panel is activated to operate in a quadratic Kerr cell mode. The modulator panel comprises a plurality of electrodes formed on one major surface in a manner allowing selective application of discrete electric fields across respective pixel portions of the panel. When the field is present across a particular pixel portion, it becomes birefringent and the polarization of light passing therethrough from the ingress polarizer is changed so as to pass through the egress polarizer. When a field is absent the modulator material remains isotropic so that egressing light is blocked by the egress polarizer.

U.S. Pat. Nos. 3,873,187; 4,569,573 and 4,491,393 describe modulators (for use in light valve devices) in which the addressing electrode structure is fabricated so as to extend along the direction of light passage through the modulator material. In this manner such an "in-depth" electrode approach provides a transverse electric field that is more uniform and that is effective throughout a large portion of light passage dimension of the modulator. In addition, the in-depth electrode approach allows use of lower electric fields, which has advantages in driver design and increases device longevity. One problem connected with the in-depth electrode approach is that modulator fabrication is extremely difficult, e.g. from the viewpoints of accurately and reliably forming the addressing electrodes and making electrical contacts to the addressing electrodes.

U.S. Pat. No. 4,707,081 describes a highly useful modulator fabrication which employs: (i) photoresist masking of a linear pixel region of a modulator wafer, (ii) grooving the wafer along each edge of the strip, (iii) vacuum deposition of metal on the wafer including the grooves and photoresist mask and (iv) further grooving and mask removal to define separately electroded modulator pixels with contact leads.

While the technique of the above-noted application is very advantageous, there are certain modulator embodiments wherein the definition of the modulator into pixels by grooving has disadvantages. For example, where high resolutions are desired, the grooving approach has limitation because the material is fragile. Also, the grooving approach to pixel definition is tedious and time consuming.

SUMMARY OF THE INVENTION

One important object of the present invention is to provide improved fabrication methods and modulator articles which implement the advantages of in-depth electrodes. In one aspect, such improvements constitute simplified fabrication techniques. In another aspect such improvements constitute more precise modulator devices. In yet another aspect such improvements constitute methods and constructions for enabling modulator array panels with two-dimensional arrays of discrete, separately addressable pixel portions.

Thus in one embodiment the present invention constitutes a light valve array member having discretely addressable electro-optic gates for selectively changing the polarization of light passing therethrough, the member comprising: (a) a wafer of electro-optic material having opposing major surfaces which are substantially flat and parallel at a modulation zone, the wafer having a pair of spaced parallel grooves of uniform depth and width which extend into the wafer's thickness from portions of one major surface of the wafer so as to form therebetween, along the modulation zone, a light modulation land portion having opposing, parallel side walls respectively within the depths of the grooves; (b) a plurality of discrete addressing electrodes deposited on the wafer, the addressing electrodes extending in spaced relation over the walls and bottom surface of a first of the grooves, with intervening wafer portions therebetween, to electrical address connection locations on the wafer; and (c) reference electrode means deposited on the wafer and extending over the walls and bottom surface of the second of the grooves to an electrical reference connection location(s) on the wafer.

In another embodiment the present invention constitutes a method of making a linear light valve array having a plurality of transversely driven, dicretely addressable, electro-optic gates, comprising the steps of: (a) cutting parallel grooves of uniform depth to form a land region on a wafer of electro-optic material; (b) holding a stencil having reference and address electrode patterns over the land region and groove portions of the wafer; and (c) depositing conductive material through the stencil to form address and reference electrodes on opposing side walls of the land region and leads for coupling such electrodes to a voltage source.

In other embodiments of the present invention, these approaches are extended to provide two-dimensional array devices.

BRIEF DESCRIPTION OF THE DRAWINGS

The subsequent description of preferred embodiments refers to the attached drawings wherein.

DETAILED DESCRIPTION OF THE PREFERRED EMBODIMENTS

Figure 1:
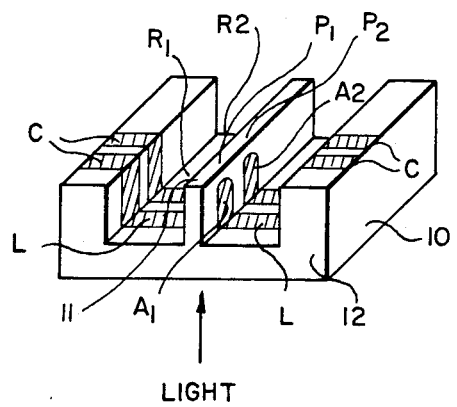
FIG. 1 is a perspective view of one embodiment of linear array modulator constructed in accord with the present invention.

Referring now to FIG. 1, there is shown a linear light valve array 10 constructed according to one preferred aspect of the present invention. In this schematic illustration, the linear light valve array comprises only two discretely addressable pixel portions $P_1$, $P_2$. As shown, each pixel portion is defined by opposing address and reference electrode pairs, $A_1$-$R_1$ and $A_2$-$R_2$, which are formed to create an electric field across a land region 11 of PLZT wafer 12. It will be noted that the field applied between such reference and address electrodes is transverse to the direction of light passage through the intervening land region and also that the field extends well into the depth of the wafer 12. FIG. 1 also shows that the address and reference electrodes are coupled by electrical leads L to connector pad regions C and that those leads extend from the electrodes, across the surfaces of the grooves which allow the in-depth electroding.

In operation, the device 10 is placed between crossed-polarizers (not shown) and light passage through this sandwich is controlled by selective energization of the electrode fields. Thus reference electrodes $R_1$ and $R_2$ can be coupled to ground via connections at C and the address electrodes $A_1$ and $A_2$ coupled to discretely operable voltage sources. For example, if a field is applied between $A_1$ and $R_1$, the light passing pixel $P_2$ will not be changed in polarization to pass the analyzer of the polarizer set. If at the same time no field is applied between $A_2$ and $R_2$, light passing $P_2$ will not be changed in polarization and will not pass the analyzer.

Figure 2:
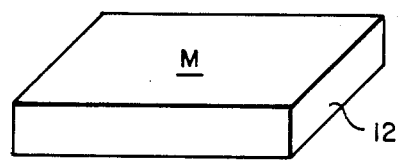
FIGS. 2-4 are schematic illustrations at various stages of the fabrication of the FIG. 1 modulator.
Figure 3:
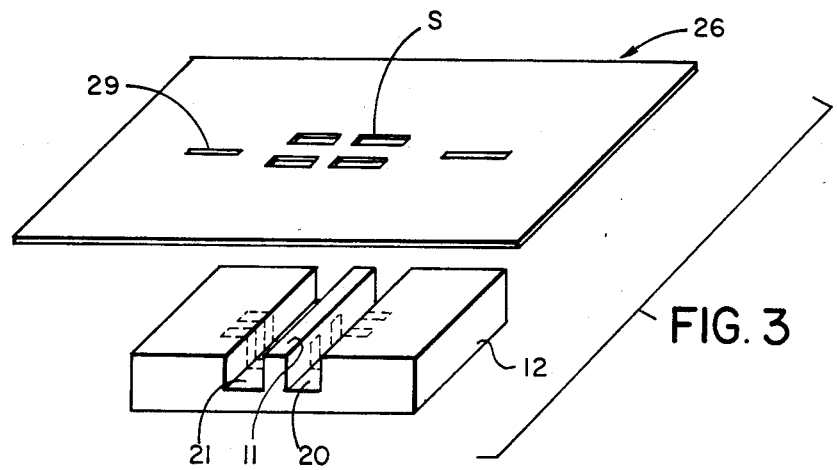
Figure 4:
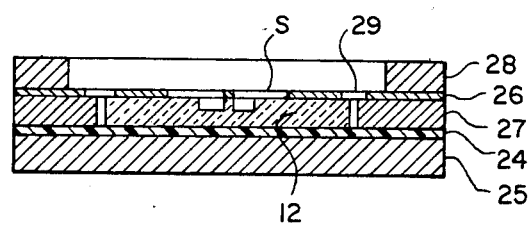

Referring now to FIGS. 2-4, the method in which FIG. 1 type modulators are fabricated according to the present invention will be described. Thus FIG. 2 illustrates a wafer of PLZT which has been polished flat on its major surfaces M. If desired the wafer can be adhered to an optically isotropic support (not shown) for subsequent fabrication steps. Next, a pair of spaced, parallel grooves 20, 21 are diced into the wafer as shown in FIG. 3 to form the intervening land region 11. Next, a stencil member 26 is placed onto the upper surface of the diced wafer as shown in FIG. 3. The stencil 26 is preferably formed of a magnetically attractable metal and its pattern of slits S is constructed by standard photolithographic and etching techniques to enable deposition, as described subsequently, of the electrode, lead, connector pad configuration (shown in dotted lines in FIG. 3).

FIG. 4 illustrates schematically, one preferred method for placing the stencil 26 in proper relation with the wafer 12 to enable good metal deposition. Thus, wafer 12 can be adhered by an adhesive tape strip 24 to a non-magnet, heating conducting spacer 27. The magnetically attractable stencil is then roughly aligned to registration marks on the wafer by viewing through corresponding apertures in the stencil (not shown). The magnet 25 is then slid adjacent to the tape causing the stencil to be held in close proximity to the surface of the wafer. Final precision alignment is now invoked between the stencil and the mark. To prevent stencl bowing during the vapor deposition step, an addition magnetic clamp member 28 can be placed around the periphery of the stencil as shown in FIG. 4. To allow venting of the zone between the spacer 27 and wafer 12, it is highly desirable to form vent apertures 29 in the stencil portion overlying this zone. While the wafer package described in regard to FIG. 4 contains only one linear array, it will be appreciated that a wafer containing many device dicings can cooperate with an appropriately configured multi-device stencil to enable the simultaneous metal deposition on many devices.

After placing the stencil 26 over the grooved surface of wafer 12 as described with respect to FIG. 4, the wafer stencil, spacer and support package is attached to a rocker table located in a metal deposition chamber. The rocker table is constructed to hold the package with the stencil facing downwardly toward the metal deposition source and to rock the package on an axis parallel to the land portion of the wafer with a rocking angle excursion that allows metal to deposit through the stencil slits onto the side walls of the grooves. Conductive metal (e.g. 100 Å of chrome and then 1 micron of aluminum) is thus deposited (e.g. by vacuum techniques) through the stencil slits to form the electrode, lead, connector pattern on the wafer surfaces as shown in FIG. 1.

Figure 5:
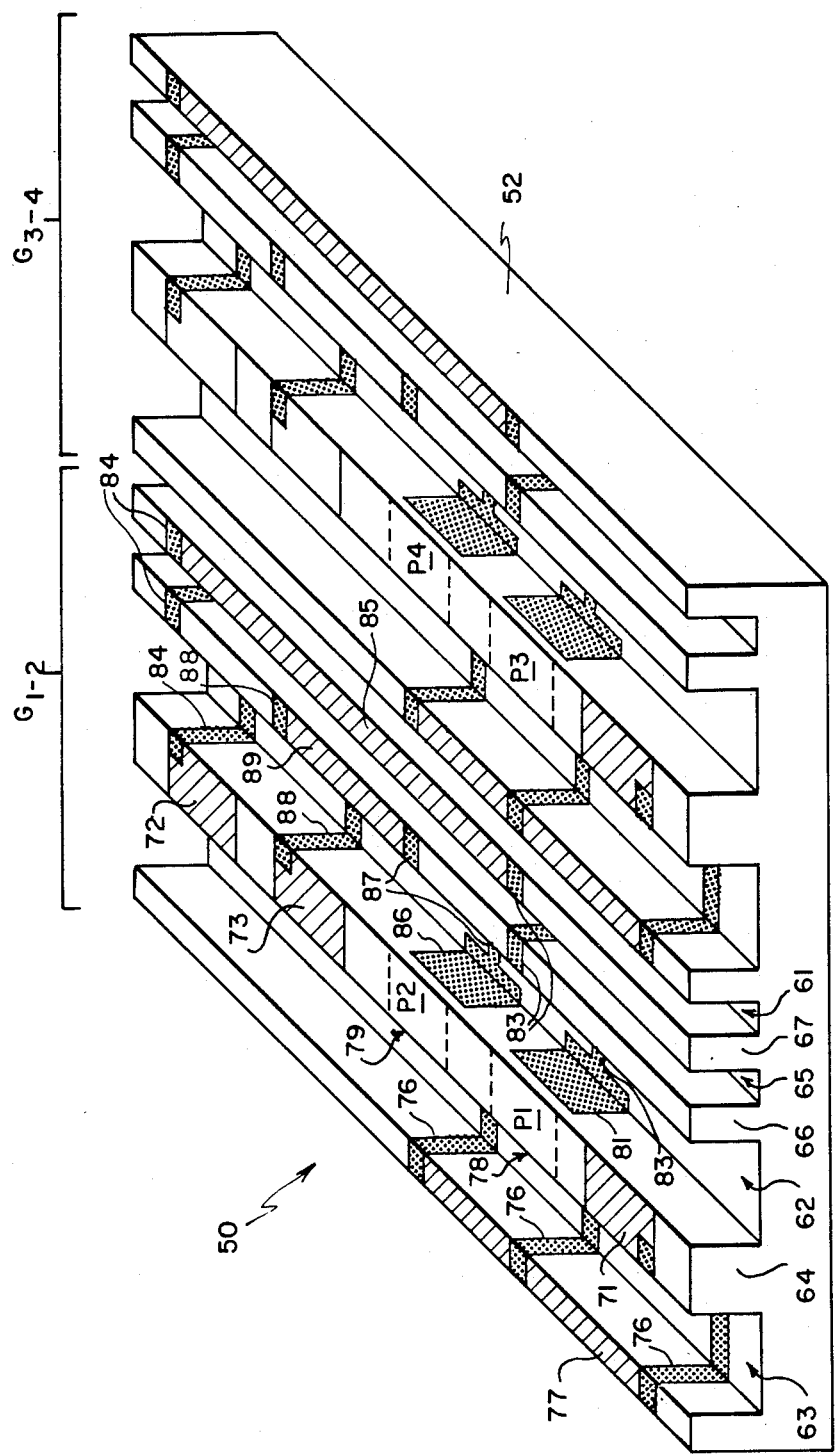
FIG. 5 is a perspective view of one embodiment of two-dimensional array modulator constructed in accord with the present invention.
Figure 6:
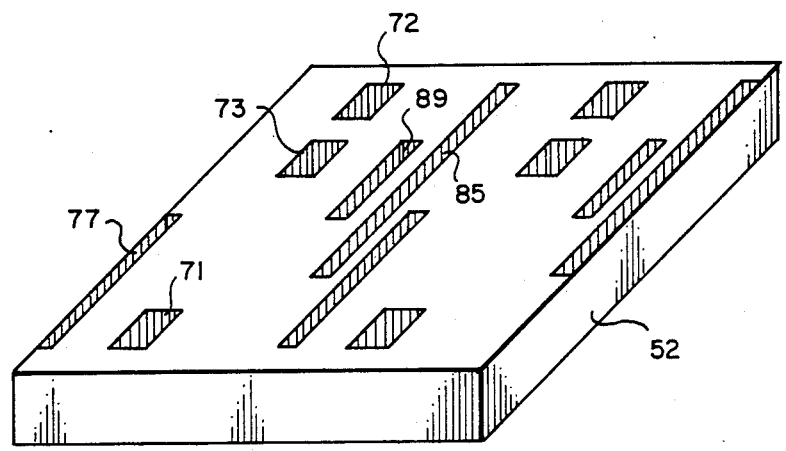
FIGS. 6-8 are schematic illustrations at various stages of the fabrication of the FIG. 5 modulator.
Figure 7:
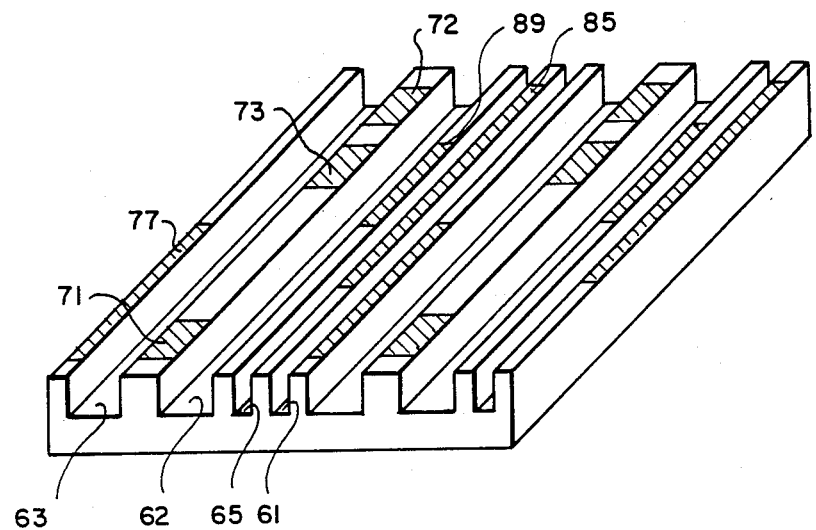

Referring now to FIGS. 5-7, the extension of the invention approach to fabrication of a two-dimensional modulator array 50 will be described. First, considering the completed modulator shown in FIG. 5, it can be seen that a PLZT wafer has been formed to have a plurality of groove and land components. More specifically, the FIG. 5 modulator comprises two groupings $G_{1-2}$ and $G_{3-4}$ of grooves and lands (separated by a central groove 61), each grouping being constructed to facilitate selective address of two of the four-pixel matrix $P_1$-$P_4$, indicated by dotted lines in FIG. 5. The two groupings can be identical and description of the grouping $G_{1-2}$ will therefore be depositive on that subject. Thus, as described regarding the FIG. 1 embodiment, a pair of spaced parallel grooves 62, 63 define an intermediate modulator land portion 64 in that sector of the wafer 52. In distinction to the FIG. 1 embodiment, modulator 50 also comprises an additional grooves, 61 and 65 which forms two bus-land portions 66, 67, for purposes that will be understood subsequently.

The modulator 50 has electrodes, and connection patterns, formed of a metal such as described above, which are constructed to allow selective address of pixel portions $P_1$ and $P_2$ from connector pads 71, 72, 73 that are located at the sides of the pixel array. Thus connector pad 71 can be coupled to a reference potential (e.g. ground) to apply that potential via leads 76 and bus 77 to reference electrodes 78, 79 on one side wall of the modulator land 64. Also, as shown in FIG. 5, address electrode 81 is coupled to connection pad 72 by means of leads 83, 84 and interconnecting bus 85. Similarly address electrode 86 is electrically coupled to connector pad 73 by lead electrodes 87, 88 and interconnecting bus 89. In operation selectively activatible voltage sources are coupled to pads 72, 73, and traverse electric fields can thereby be provided across pixel portions $P_1$ and $P_2$ to cooperate with sandwiching polarizers in controlling light passage. It will be appreciated that when similar ground and address potentials are coupled to the pads of sector $G_{3-4}$, a two-dimensional array of pixel portions $P_1$-$P_4$ can be operated to selectively control light passage.

Figure 8:
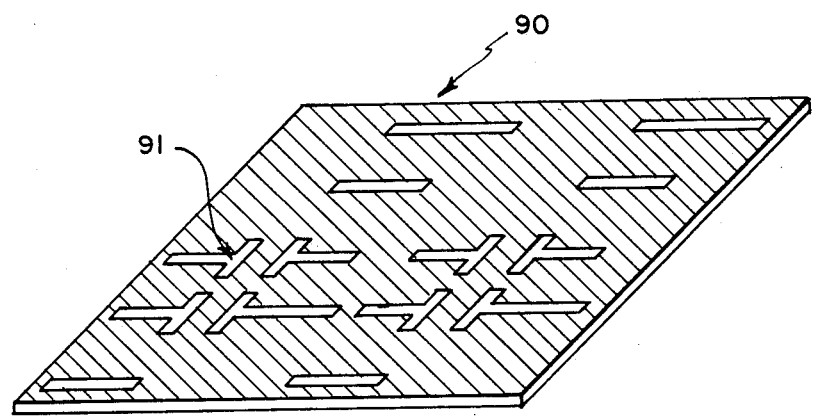

The fabrication of the modulator 50 employs the approach described with respect to FIGS. 2-4; however, an additional feature is preferred. Thus, referring to FIG. 6, the bus electrode and connector pads are formed on wafer 52 by a lift-off process employing photolithography, e.g. such as described in U.S. patent application Ser. No. 074,849, filed July 17, 1987. Next, the wafer is diced to form the grooves as shown in FIG. 7. Finally, a stencil 90 having a slit pattern 91 shown in FIG. 8 for forming the electrodes and leads shown in FIG. 5 is placed over the grooved surface of the wafer as described with respect to the FIG. 1 embodiment. The stencil wafer and support package is then placed on a rocker table as described above and metal deposition is effected to form the finished device shown in FIG. 5.

The foregoing description indicated the technique for forming a 2×2 pixel device; however, the constructional approach and fabrication technique explained can be utilized to make a two-dimensional device of much higher numbers of pixels. The main constraint presently existing with regard to the number of pixels per wafer occurs due to a resolution fall off in the inter-land dimension. Thus, as increasing pixels are electroded onto a given land, the number of inter-land isolator grooves required for forming separate address bus regions increases. Optical focusing techniques can be used to compensate for this.

The foregoing constraint can be understood more clearly by further explanation of the purpose and advantages of the groove 65 and shown in FIG. 5. Thus, if one considers the electro-optic effect that would occur if those grooves were not present, it will be recognized that a field would exist between the surface bus electrodes, e.g. 85, 89, and penetrate into the intermediate material. Groove 61 serves a similar purpose in regard to electrode 85 on the opposing ground electrode of grouping $G_{3-4}$. Such a field would affect the birefringence of intermediate modulator material and cause unwanted light leakage through a light valve device employing the modulation. The grooves of the present invention remove electro-optic material between these address electrodes and thus avoid such unwanted light leakage. The grooves between address electrodes provide another advantageous function. Thus, when the adjacent electrodes operate without intervening grooves, a high capacitance is presented to the address electrode drivers. The provision of grooves between the address electrodes increases the effective spacing between electrodes and the inter-electrode capacitance thus drops substantially. This allows successful use of high voltage (e.g. 400v) drivers.

In employing devices such as shown in FIGS. 1 and 5, one additional refinement has been found useful. Thus, the dicing of grooves sometimes leaves residual scratches on the groove bottoms. Such scratches can scatter passing light, disturbing its polarization and causing light leakage. To avoid this condition, it is highly useful to provide a mask coating over the groove bottoms. A preferred technique for effecting such masking is, after electroding, to fill the grooves with a dielectric masking liquid. Various settable, dielectric liquids containing black pigments or dyes can be used. A useful coating technique is to fill the grooves by capillary action with a liquid whose meniscus does not extend onto the land surfaces of the light modulation regions.

The invention has been described in detail with particular reference to preferred embodiments thereof, but it will be understood that variations and modifications can be effected within the spirit and scope of the invention.

I claim:

1. A light valve array member having discretely addressable electro-optic gates for selectively changing the polarization of light passing therethrough, said member comprising:
   (a) a wafer of electro-optic material having opposing major surfaces which are substantially flat and parallel at a modulation zone, said wafer having a pair of spaced parallel grooves of uniform depth which extend into said wafer's thickness from portions of one major surface of said wafer so as to form therebetween, along said modulation zone, a light modulation land portion having opposing, parallel side walls respectively within the depths of said grooves;
   (b) a plurality of discrete addressing electrodes deposited on said wafer, said addressing electrodes extending in spaced relation over the walls and bottom surface of a first of said grooves, with intervening wafer portions therebetween, to electrical address connection locations on said wafer; and
   (c) reference electrode means deposited on said wafer and extending over the walls and bottom surface of the second of said grooves to an electrical reference connection location(s) on said wafer.

2. A light valve array member having transversely driven, discretely addressable, electro-optic gates for selectively changing the polarization of incident polarized light, said array member comprising a planar wafer of electro-optic material, said wafer having two parallel grooves formed therein which collectively define a linear land portion of electro-optic material, and first and second electrode means vacuum deposited respectively on first and second opposed walls of said land portion at least one of said electrode means comprising a plurality of electrode strips having electro-optic material therebetween and defining a plurality of discretely addressable electro-optic gates.

3. A method of making a linear light valve array having a plurality of transversely driven, discretely addressable, electro-optic gates, comprising the steps of:
   (a) cutting parallel grooves of uniform depth to form a land region on a wafer of electro-optical material;
   (b) holding a stencil having reference and address electrode patterns over said land region and groove portions of said wafer; and
   (c) vacuum depositing conductive material through said stencil to form address and reference electrodes on opposing side walls of said land region.

4. The invention defined in claim 3 wherein said stencil pattern is constructed to allow deposit of lead strips to extend from said side wall electrodes across said grooves and to a bonding region on said wafer.

5. A light valve modulator member having a two-dimensional array of discretely addressable pixel portions, said member comprising:
   (a) a wafer of electro-optic material having at least two spaced, parallel modulator land portions, each respectively defined by a pair of opposing grooves;
   (b) address electrode means formed in a first groove of each groove-pair, and including a plurality of spaced, conductive strip portions extending across the walls and bottom of said first groove;
   (c) reference electrode means formed in the second groove of each groove-pair, and including a conductive portion(s) extending across the walls and bottom of said second groove in opposing relation to said address strip portions to define therebetween a light modulation region.

6. The invention defined in claim 5 further comprising, adjacent each of said first grooves, a land-groove-land construction having electrode leads which connect each of said spaced address electrode strips discretely to a separate connection zone on said wafer.

7. The invention defined in claim 6 wherein said address electrode connection zones are at discrete locations on said modulator land portion, spaced from said modulation regions.

8. The invention defined in claim 7 wherein reference electrode means are coupled to a connection zone located on said modulator land portion and spaced from said modulation regions.

9. A method of fabricating a two-dimensional light valve modulator having a plurality of discretely addressable, transversely driven pixel portions, said method comprising:
- (a) forming a plurality of conductive bus and pad portions on an electro-optic wafer;
- (b) forming a plurality of parallel grooves between said bus and pad portions to define:
  - (i) a plurality of modulator land portions having pad portions on the top thereof; and
  - (ii) a plurality of bus-land portions having bus portions on the top thereof; and
- (c) holding a patterned stencil over the grooved surface of said wafer and depositing conductive material through the patterns of said stencil to form:
  - (i) address and reference electrodes on opposing side walls of said modulation lands; and
  - (ii) electrical connections between said address and reference electrodes and said pad portions via said bus portions.

10. A method of making a light valve device having a transversely driven, discretely addressable, electro-optic gate, comprising the steps of:
- (a) cutting parallel grooves to form a land region on a wafer of electro-optical material;
- (b) holding a stencil having reference and address electrode patterns over said land region and groove portions of said wafer; and
- (c) vacuum depositing conductive material through said stencil to form address and reference electrodes on opposing side walls of said land region.

* * * * *